Inventor
J. R. Howard

Dec. 10, 1929.  J. R. HOWARD  1,738,708
APPARATUS FOR EXERCISING THE OCULAR MUSCLES AND FOR FUSION TRAINING
Filed Sept. 29, 1928  3 Sheets-Sheet 3

Inventor
J. R. Howard
by Jno. Irwin
Atty

Patented Dec. 10, 1929

1,738,708

UNITED STATES PATENT OFFICE

JOSEPH RICHARD HOWARD, OF LONDON, ENGLAND

APPARATUS FOR EXERCISING THE OCULAR MUSCLES AND FOR FUSION TRAINING

Application filed September 29, 1928, Serial No. 309,318, and in Great Britain September 29, 1927.

This invention refers to an apparatus for exercising the ocular muscles and for training the fusion sense.

The primary object of the present invention is to provide an instrument of precision designed to overcome some of the difficulties surrounding the use of stereoscopes, and amblyscopes, in particular that it provides a means of conducting the exercises under the control of the operator, rather than depending on the aptitude of the patient to realize the significance of the treatment; also that the basis of the principle of the training lies in the appeal to the brain sense to retain binocular stereoscopic vision, rather than in the attempt to fuse dissimilar objects.

Another object of the invention is to provide apparatus by means of which a surgeon or other competent person can diagnose the nature of the treatment and prescribe the limits of the exercise which can then be readily conducted subsequently by an assistant.

Now according to the present invention, I provide apparatus for exercising the ocular muscles and for training the fusion sense, comprising a pair of substantially coaxially arranged horizontal tubes each carrying at its outer end a stereoscopic lantern slide transparency and terminating at its inner end in an eye piece having a focus lens and a right angled optical prism, the eye pieces being mounted so as to be adjustable to the pupillary distance of the patient and the tubes being mounted for relative angular movement in a horizontal plane.

In order that the invention may be clearly understood and more readily carried into effect, it is hereinafter described with reference to the accompanying drawings, in which:—

As shown and in carrying the present invention into effect the exercising apparatus comprises a pair of eye-pieces $a, a$ which are mounted on a table, stand or other suitable support $b$ so as to be adjustable to the pupillary distance of the patient indicated by the scales $a'$ and pointers $a^2$ thereby obviating any prismatic effect from decentration. The eyepieces each have a focus lens $c$ and a right angled optical prism $d$ whereby stereoscopic lantern slide transparencies $e$ placed at the ends of horizontal tubes $f$ and illuminated from behind as by means of lamps $g$ are viewed. The images of the slides $e$ by reason of the prisms $d$, appear projected immediately in front of the patient, and by the careful movement of the tubes $f$ the images can be superimposed to form a single stereoscopic picture. The transparencies $e$ can be varied to suit children or older patients and can be adapted to the requirements of the various treatments for which the instrument can be used. The slides $e$ may conveniently be illuminated evenly through ground glass screens $h$ by means of the aforesaid lamps $g$ which may be mounted in hinged or removable hoods $i$ adapted to permit of easy replacement of the same. The lamps $g$ may be lit from any suitable source, such for instance, as the electric supply mains or a battery (not shown) arranged in a case $j$ arranged on the stand $b$, resistances $k$ being employed in the circuit of one or both lamps to effect variable illumination as for stimulating a partial amblyopia.

Figure 1:
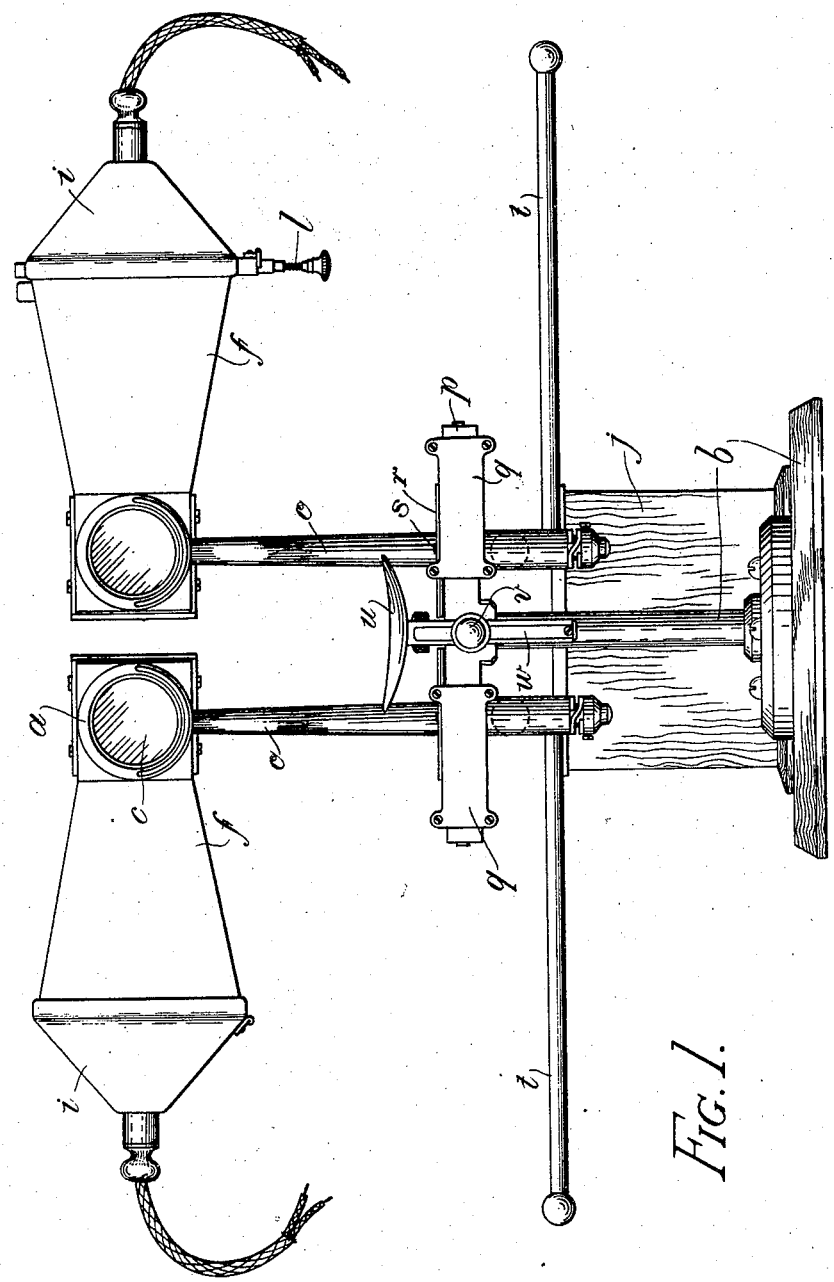
Figure 1 is a front elevation of the improved apparatus conveniently referred to as a "synoptiscope"
Figure 2:
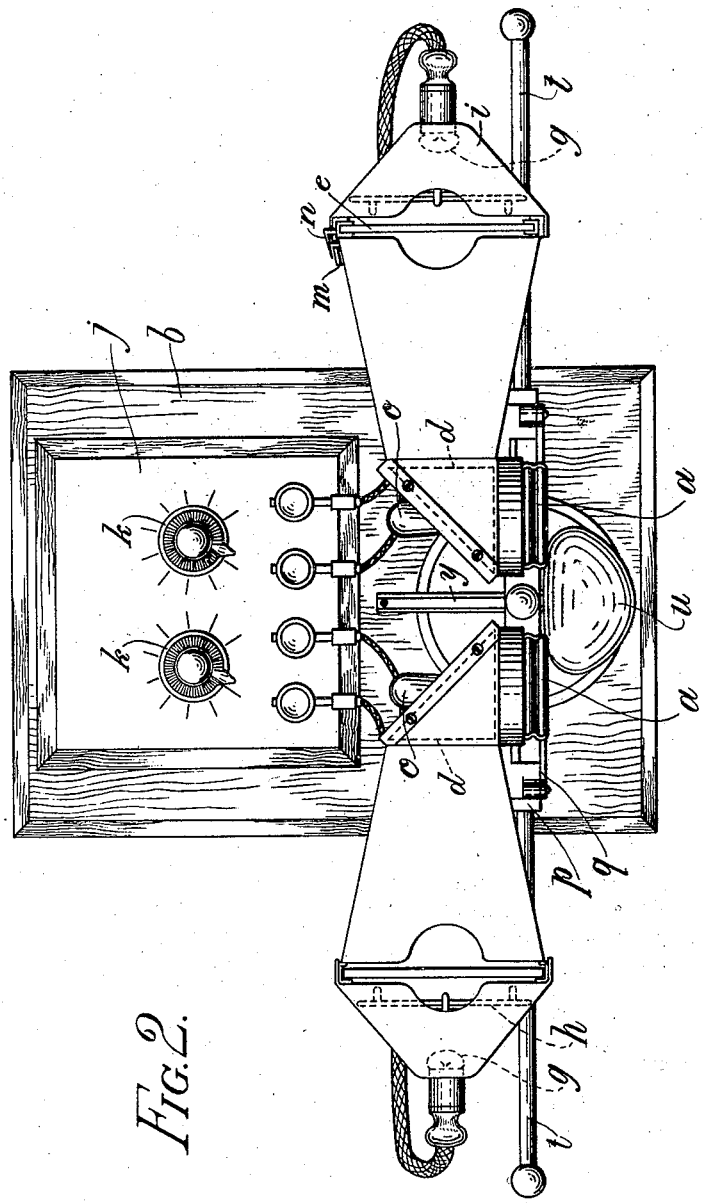
Figure 2 is a plan view thereof.
Figure 3:
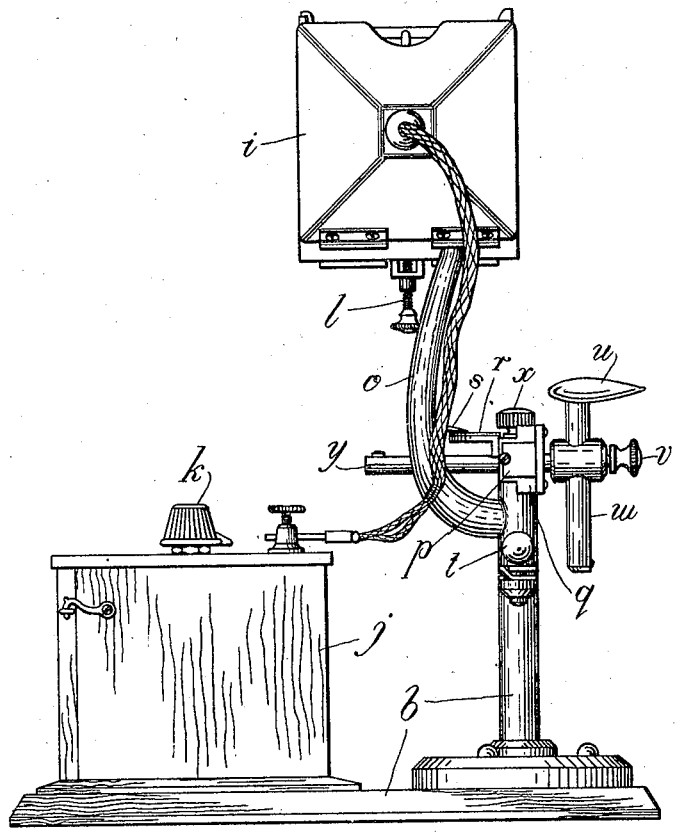
Figure 3 is a side elevation thereof.
Figure 4:
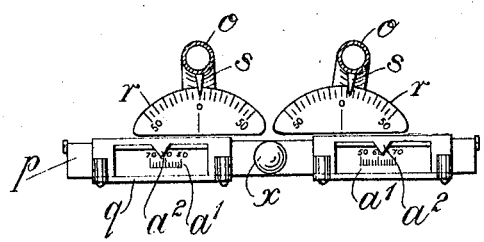
Figure 4 is a detail plan illustrating the scales and pointers indicating the pupillary distance and the angular movement of the two eye tubes.

One of the tubes $f$, the right hand one in Figure 1, may also have a hand screw $l$ or other device for raising or lowering one slide $e$ as is required for hyperphoria treatment, and in such a case it is preferably also furnished with a scale $m$ and pointer $n$ indicating deviation effect.

The adjustment of the tubes $f$ for pupillary distance may conveniently be effected by mounting them on vertical arms $o$ which are mounted to slide towards or away from each other on a horizontal bar $p$. The angular adjustment of the tubes $f$ may be effected by mounting the said vertical arms $o$ so that they can rotate in relation to their carriers or slides $q$, scales $r$ and pointers $s$ being provided to indicate the angular position of the tubes $f$. This angular movement of the tubes $f$ may be effected by means of projecting arms or hand levers $t$ or where greater precision is required, by means of a worm and pinion mechanism actuated through a milled wheel or its equivalent at the end of the shaft carrying the worm.

An adjustable chin or head rest $u$ is provided to assist the patient in keeping his head in fixed relationship to the eyepieces $a, a$, the adjustment being effected vertically by means of a milled screw $v$ engaging a vertically adjustable rod $w$ and horizontally by means of a screw $x$ and sliding rod $y$.

In a slightly modified construction one tube $f$ may be provided with a rotating end for carrying the slide $e$ and the lamp $g$, thus giving a further degree of adjustment for cyclophoria cases.

What I claim is:—

1. In an apparatus for exercising the ocular muscles and for training the fusion sense, comprising a pair of co-axially arranged horizontal tubes, a lantern slide transparency carried by each tube, means carried by each tube for illuminating such transparency, an eye-piece carried at the inner end of each tube and including a focus lens and a right angled prism, a bar on which the tubes are slidably mounted to permit pupillary distance adjustment of the tubes relative to each other, means for supporting the tubes for pivotal movement to permit of their relative angular adjustment in a horizontal plane, and visible indicators for determining the extent of pupillary adjustment and the degree of angular movement.

2. In an apparatus for exercising the ocular muscles and for training the fusion sense as defined in claim 1, including means carried by one of the tubes for vertically adjusting said lantern slide transparency.

3. An apparatus for exercising the ocular muscles and training the fusion sense as defined in claim 1, including a head-rest to assist in keeping the patient's head in fixed relation to the eye-pieces, and means for adjusting the head-rest.

4. An apparatus for exercising the ocular muscles and for training the fusion sense as defined in claim 1, including hand levers for controlling the angular adjustment of the tubes.

In testimony whereof I have hereunto signed by name.

JOSEPH RICHARD HOWARD.